Patented Dec. 6, 1927.

1,651,638

UNITED STATES PATENT OFFICE.

JOSEPH KENT SMITH, OF WORKSOP, ENGLAND, ASSIGNOR, BY MESNE ASSIGNMENTS, TO GRANULAR IRON COMPANY, A CORPORATION OF MICHIGAN.

PROCESS OF MAKING STEEL.

No Drawing.    Application filed January 10, 1925.   Serial No. 1,555.

This invention relates to a process for making steel on the gas, oil, tar, or powdered coal fired open hearth, from solid produced iron.

Attempts have been made to produce iron from iron bearing ores in the solid state, i. e., without melting and the literature of the art contains many references to such attempts. Recently it has been discovered how iron may be solid produced in a practical commercial manner. Attempts to make steel from such product, however, have heretofore, in so far as I am aware, not met with success, probably because the nature of the product was not fully understood.

The object of this invention is, therefore, to provide a method whereby such solid produced iron may be effectively and economically converted into steel; and more specifically it is an object of the present invention to make possible the conversion of such solid produced iron into steel on the fuel fired open hearth.

It is a characteristic of iron produced in the solid way that it will oxidize readily and that it also has a high melting point. The atmosphere obtaining in the fuel fired open hearth furnaces is oxidizing to iron itself, in consequence of which, when solid produced iron is attempted to be melted in such a furnace, it oxidizes before it melts.

I propose, therefore, to protect the iron from the oxidizing influences in the furnace atmosphere to which end, broadly speaking, I render these influences ineffective in so far as the iron is concerned by the introduction, into the charge, of other materials, preferably pig iron, some of the constituents of which are even more susceptible to the oxidizing influences than the iron.

In carrying out my invention with the basic process of open hearth conversion, I prefer to first cover the bottom of the furnace with lime and then charge in a portion of the iron, after which I charge in a layer of pig iron, either in the solid or fluid state. In either state it constitutes a layer interposed between the iron and the furnace atmosphere, shielding or protecting the iron from the oxidizing influence. This shield becoming progressively more effective in the case where pig in the solid state is used, as melting proceeds. The charge thus introduced is melted, whereupon the remaining portion of the iron, if any, is then charged into the fluid bath sinking under the slag that has already been formed, in consequence of which such portion of the charge of iron is similarly shielded from the oxidizing influence.

I have found in the case of pig iron, that the amount thereof should constitute from approximately 15 to approximately 25% of the total charge by weight. While the upper limit may be exceeded, I have found it best practice not to employ materially less than 15% of pig iron. The pig iron in addition to its function of shielding the solid produced iron from the oxidizing influences, performs the added function of dissolving such iron which, as heretofore indicated, has a high melting point. I am thereby enabled to convert with much less destructive effect on the furnace.

Instead of employing pig iron, ferro silicon or other similar protective agent, may be used, the percentage of such agent with reference to the total amount charged, varying with the nature thereof. Thus, for example, with ferro silicon I would employ an amount very much less than 15%, probably in the neighborhood of 5 to 10%.

The foregoing is upon the assumption that mill scrap is not being utilized. When, however, mill scrap must be taken care of, I include the scrap in the initial charge as before described. Irrespective of whether or not mill scrap is charged with the solid produced iron, I employ the percentage of pig iron above set forth; that is to say, the pig iron should constitute from about 15 to about 25% of the total charge.

In conversion by the acid process, I proceed along the lines above set forth, with the exception that I do not employ a lime floor covering. No floor covering may be required, but sand or other siliceous material may be used to good effect if desired, or a small layer of pig iron may be first charged on the hearth.

When iron is produced in the solid state from its ores resulting in the solid produced iron referred to, the earthy, mineral dross adheres to some extent to the iron nodules. The presence of such dross, however, is not necessarily objectionable in converting the iron on the fuel fired hearth. Therefore, it is generally not necessary in carrying out my process to completely separate such dross from the iron, as ordinarily the dross will contain no constituent which would be appreciably harmful.

The solid produced iron referred to is iron in the form of granules or nodules which have been reduced by direct action while in a solid state by heat treatment in conjunction with suitable carbonaceous material, the reaction being carried on without fusion or melting of the ore. In short, the ore is reduced to the so-called solid produced iron without passing through the melting stage as in the usual blast furnace practice.

I claim:

1. In the manufacture of steel, the process which includes supplying a charge of solid produced iron to an open hearth furnace, covering such charge with pig iron so as to render the oxidizing influence of the furnace atmosphere ineffective to the solid produced iron.

2. In the manufacture of steel, the process which includes supplying a charge of solid produced iron to an open hearth furnace, covering such charge with a protective layer of molten pig iron which is adapted to trickle down through said charge and dissolve the same.

3. In the manufacture of steel, the process which includes supplying a charge of solid produced iron to an open hearth furnace, covering such charge with a protective agent such as pig iron, ferro-silicon or the like, so as to render the oxidizing influence of the furnace atmosphere ineffective to the solid produced iron.

In testimony whereof, I have hereunto signed my name.

J. KENT SMITH.